United States Patent
Gerards

(10) Patent No.: US 11,993,525 B2
(45) Date of Patent: May 28, 2024

(54) ANAEROBIC WASTE WATER PURIFICATION TOWER

(71) Applicant: WATERLEAU GROUP NV, Wespelaar (BE)

(72) Inventor: Ronny Gerards, Attenhoven (BE)

(73) Assignee: WATERLEAU GROUP NV, Wespelaar (BE)

( * ) Notice: Subject to any disclaimer, the term of this patent is extended or adjusted under 35 U.S.C. 154(b) by 41 days.

(21) Appl. No.: 17/426,550

(22) PCT Filed: Jan. 29, 2020

(86) PCT No.: PCT/EP2020/052145
§ 371 (c)(1),
(2) Date: Jul. 28, 2021

(87) PCT Pub. No.: WO2020/157119
PCT Pub. Date: Aug. 6, 2020

(65) Prior Publication Data
US 2023/0295025 A1    Sep. 21, 2023

(30) Foreign Application Priority Data

Jan. 30, 2019  (BE) .................................. 2019/5052
Jan. 30, 2019  (EP) ..................................... 19154556

(51) Int. Cl.
*C02F 3/28*          (2023.01)
(52) U.S. Cl.
CPC .......... *C02F 3/2846* (2013.01); *C02F 3/2873* (2013.01); *C02F 2203/006* (2013.01)

(58) Field of Classification Search
CPC . C02F 3/2846; C02F 3/2873; C02F 2203/006
USPC ................................................... 210/188, 603
See application file for complete search history.

(56) References Cited

U.S. PATENT DOCUMENTS

| 4,253,956 A * | 3/1981 | Pette | C02F 3/2846 |
| | | | 210/539 |
| 2009/0308806 A1* | 12/2009 | Vellinga | C12M 23/36 |
| | | | 210/603 |

FOREIGN PATENT DOCUMENTS

| CN | 107082491 A | * | 8/2017 |
| CN | 107986440 A | * | 5/2018 |
| DE | 202015002308 U1 | | 4/2014 |
| EP | 0808805 A1 | * | 11/1997 |
| EP | 2767516 A1 | * | 8/2014 |

OTHER PUBLICATIONS

Machine-generated English translation of EP 0808805, generated on Nov. 1, 2023.*

(Continued)

*Primary Examiner* — Fred Prince
(74) *Attorney, Agent, or Firm* — Maschoff Brennan

(57) ABSTRACT

The invention relates to an anaerobic waste water purification tower (21) comprising a sludge reactor (22) with a waste water inlet zone (23), an active zone (24), a first set (25) of three phase separating means for separating sludge, gas and water, comprising at least one layer of adjacent gas hoods (26) connected to a gas collector tank (27) positioned above the reactor (22), and a clean water effluent outlet (31), wherein the gas hoods (26) are hooded lamellas for improving the separation of gas, sludge and water.

10 Claims, 7 Drawing Sheets

(56) References Cited

OTHER PUBLICATIONS

Machine-generated English translation of CN 107986440, generated on Nov. 1, 2023.*
Machine-generated English translation of DE 202015002308, generated on Nov. 1, 2023.*
Machine-generated English translation of CN 107082491, generated on Nov. 1, 2023.*

* cited by examiner

ANAEROBIC WASTE WATER PURIFICATION TOWER

The invention relates to the field of anaerobic water treatment, and in particular to one new anaerobic reactor of the UASB type, comprising a new type of settlers and a new feeding system, resulting in Anaerobic High Rate Tower (AHRT).

BACKGROUND OF THE INVENTION

Industries generating contaminated waste water may need to proceed to a purification of their waste water before releasing it to further treatment processes or to proceed to a sufficient purification to be allowed to release it into the natural water cycle.

A common convenient, low foot-print water treatment unit is an anaerobic waste water treatment reactor, and in particular a UASB, a subtype of a fluidized bed reactor. In such towers, waste water is injected at the bottom of the reactor, in which a blanket of granular sludge of microorganisms, each granule being constituted in several layers, constituted by a consortium of different kinds of microorganisms, archaea, bacteria, among others, is maintained in suspension owing to a combination of the upward flow and the settling effect of gravity. Next to water (liquid phase) and sludge (solid phase) biogas (gas phase) is also present. Biogas is produced by the bacteria upon decomposition of the organic impurities dissolved in the waste water.

While the sludge needs to be mostly maintained (recycled/expended/fluidized) in the reactor, the biogas and effluent are extracted. The purified water converges towards the top of the reactor, where it is drawn out of the reactor as effluent purified water. The biogas is collected from the gas tank and is preferentially used as energy source after certain pretreatment.

As illustrated of FIGS. 1a and 1b, which are two schematic side cut-views of the same anaerobic reactor 1 from different sides, the waste water flows into the reactors by the bottom 2 of the tower 1, which is arranged with an oblique pane 3 to promote the gliding of the settling solid matter towards the edge of the pane. The inlets of waste water are situated at the bottom of the pane to ensure that the up-flow retakes the settling sludge. This is however mildly efficient because part of the settled sludge tends to remain on the oblique portion, thereby lowering the amount of sludge in the active mixing zone. The large oblique panes 3 at the bottom also limit the volume of the active volume 4 in which sludge is mixed with water, thereby limiting the efficiency of the system.

To separate the gas from the mixture of water and sludge, several layers of settlers 5, or three phase separators, are arranged on top of each other, at two different heights of the anaerobic reactor, arranged as one tower, a first set of layers at about ⅔ of the height and a second set of layers of settlers close to the top, the space between the sets of settlers being called a polishing zone 7. It is alternatively also possible that a tower has only one settler or has three settlers.

The settlers are designed as up-side-down gutters with vertical side walls and are arranged closed to each other with a gap between them to allow the up-flow of water, along with some of the gas. The gas bubbles, having an ascending motion, are entrapped below the settler (gas hood) and guided along the settler (gas hood), towards a central extraction channel 6. The gas bubbles are also conveying sludge and their motion ensure the mixing of the sludge. The settlers also have the function to separate the sludge from the gas bubbles before they are extracted, the separated sludge can then move back down into the active zone, owing to gravity. A problem of such so called "three phase" separators is that efficient collection of the gas requires at least three or four layers of gas hoods at both levels, taking a non-negligible height of the tower and thereby reducing the active volume where sludge can be mixed and react with water, and thereby also reducing the overall efficiency of the system. The height of such settlers also leads to big non used volume, which is therefore not efficiently used to degrade pollutants.

The only way to increase its yield is to increase the size and footprint of the tower.

The object of the invention is to increase the efficiency of UASB tower while limiting its footprint and optimizing the height.

SOLUTION OF THE INVENTION

To this end, the invention relates to an anaerobic waste water purification tower comprising a sludge reactor with, seen from the bottom:
  a waste water inlet zone,
  an active zone,
  a first set of three phase separating means for separating sludge, gas and water, comprising at least one layer of adjacent gas hoods connected to a gas collector tank positioned above the reactor, and
  a clean water effluent outlet,
characterized in that the gas hoods are hooded lamellas for improving the separation of sludge, gas and water.

The active zone is the volume in which the contaminated waste water is mixed with the active sludge converting organic pollutants into (bio)gas.

By hooded lamellas, it is referred to mostly parallel lamellas, defining channels tilted from a vertical orientation, the top portion of each lamella being bent to form a hood, covering, but not closing, the channels. Each lamella with a bended top or hood forms a gas hood. The principle of lamellas is known for favoring settling of solid matters in water treatment technologies. Combining the principle of settling lamellas with the concept of hood allows a synergetic effect on the separation by:
  reducing the upward path of gas, as the hood overlaps the adjacent lamella, thereby ensuring the trapping of gas on the full area of the layer; this results in
  optimizing the gas collection by one layer of gas hoods while
  increasing the settling capacity of the three phase separator owing to the larger contact area offered by the lamellas, and thereby ensuring a better sludge retention time, while
  allowing to reduce the number of gas hood layers needed for optimal efficiency compared to known systems, thereby reducing the volume of the set of three phase separators, and
  leaving more active volume to convert pollutants and/or reducing the system volume and/or footprint.

This, a priori simple, gas hood design results in a drastic increase of the efficiency of the waste water purification tower.

In an advantageous mode of realization, each gas hood connected to the gas collector tank is provided with means to maintain a gas buffer in each gas hood. Maintaining a layer of gas below the hood at all times allows a better solid/sludge separation.

The sludge reactor of the anaerobic waste water purification tower of the invention can further comprise, above the first set of three phase separating means:
- a polishing zone, and
- a second set of three phase separating means comprising at least one layer of gas hoods connected at one end to a gas collector tank positioned above the reactor.

The efficiency of the waste water purification tower is even enhanced when adopting a special arrangement of the inlet zone or feeding system. Instead of placing a large oblique pane at the bottom of which the water is let in, the bottom of the sludge blanket reactor is accordion shaped, i.e. arranged with folds forming alternating vales and crests, waste water inlets extending above and along the vales. Due to this arrangement, the sludge may settle on several smaller slopes. The inlet waste water flow can recirculate the settling sludge more efficiently owing to the decreased distance between any settling sludge and a waste water inlet, thereby ensuring sludge (re)circulation in the active zone. The overall upward flow is also more homogeneous, leading to an optimized mixing of sludge and waste water in the active zone. Combined with the unique hooded lamellas, the overall efficiency of the high rate anaerobic waste water purification tower is even enhanced. This would however not be the case with standard three-phase separators, as these would not be efficient enough to handle the higher gas production resulting from the higher recirculation, and therefore activity, of the active sludge. In such a case, more layers of standard three phase separators would be needed, resulting in a higher tower and/or a smaller active zone. This would be counterproductive.

The invention will be better understood with the following description of several examples, referring to the accompanying drawing on which:

Figures 1A, 1B:
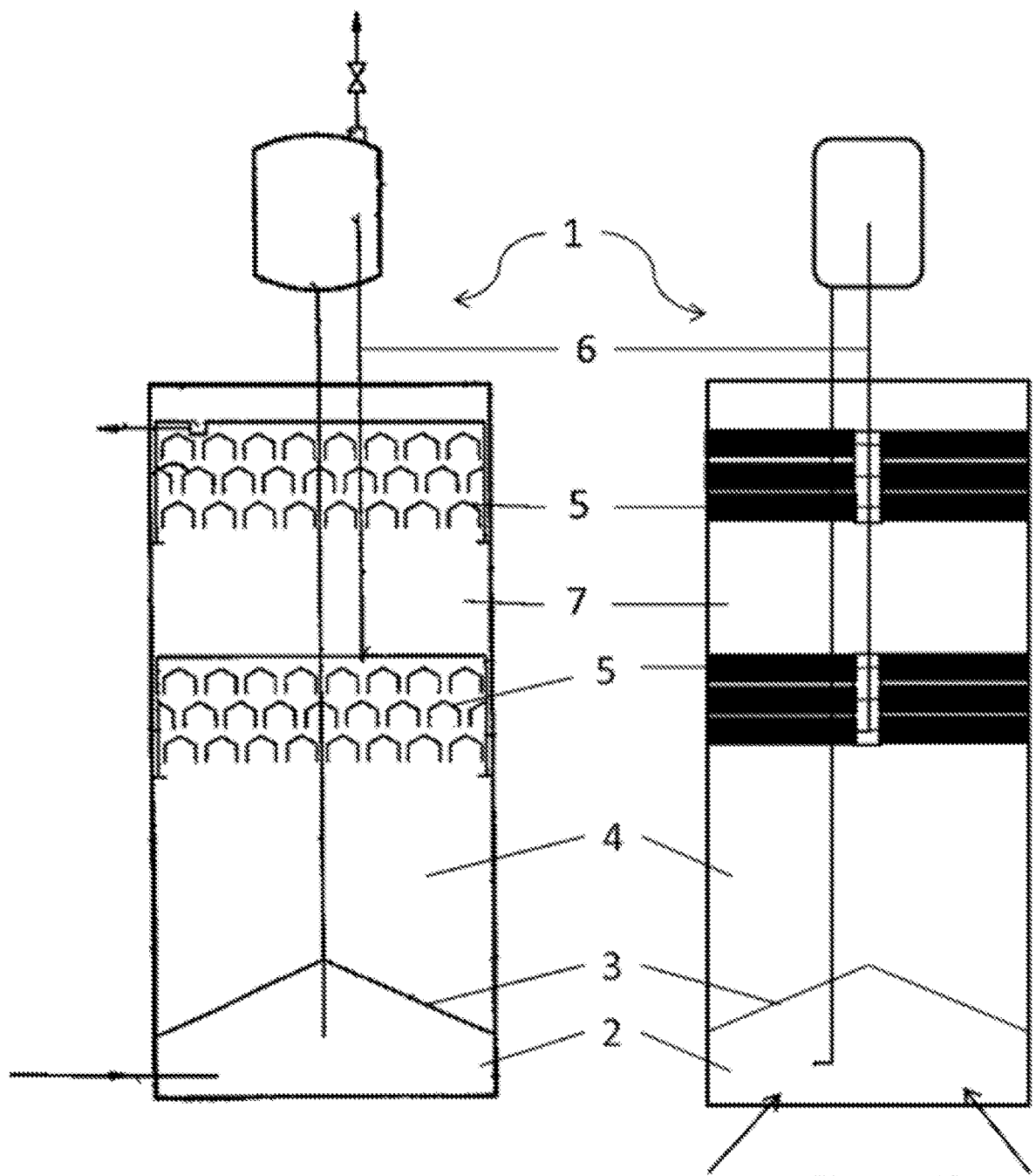
FIGS. 1a and 1b are two schematic side views of the same tower 1 from different sides.
Figure 2:
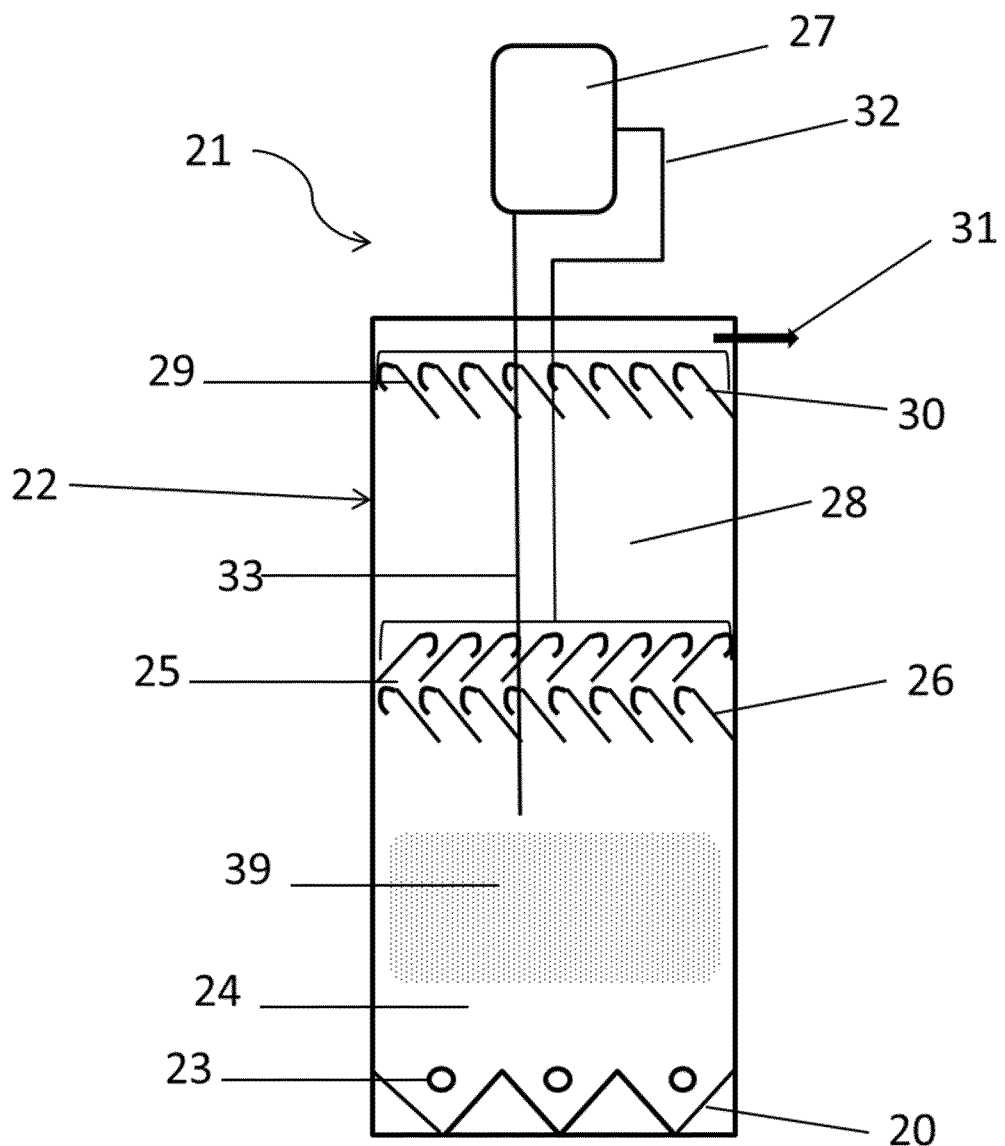
FIG. 2 is a schematic lateral view of a waste water purification tower according to the invention.

Referring to FIG. 2, a high rate anaerobic waste water purification tower 21 comprises a sludge blanket reactor 22 in which are arranged from bottom to top in the following order a waste water inlet zone 23, a most active zone 24 comprising sludge 39, a first set of three phase separating means 25 comprising here two layer of adjacent parallel gas hoods 26 connected to a gas collector tank 27 positioned above the reactor 22 through a riser 32, a polishing zone 28, a second set of three phase separating means 29 comprising one layer of gas hoods 30 connected to the gas collector tank 27 through the riser 32, and a clean water effluent outlet 31, which can comprise a weir (not represented). A downer 33 is connecting the bottom of the gas collector tank 27 to the active area 24. The bottom 20 of the reactor 22 has here an accordion shape.

The inlet zone 23 may comprise any form of waste water inlet known in the art of UASB-reactor, or specific type of water loops as will be described below.

The gas hoods 26 of the first set of three phase separating means of settlers 25 are here represented identical to the gas hoods 30 of the second set of settlers 29. However, the first set 25 comprise here two layers of gas hoods for only one layer in the second set 29. It would also be possible to have more layers.

Figure 3:
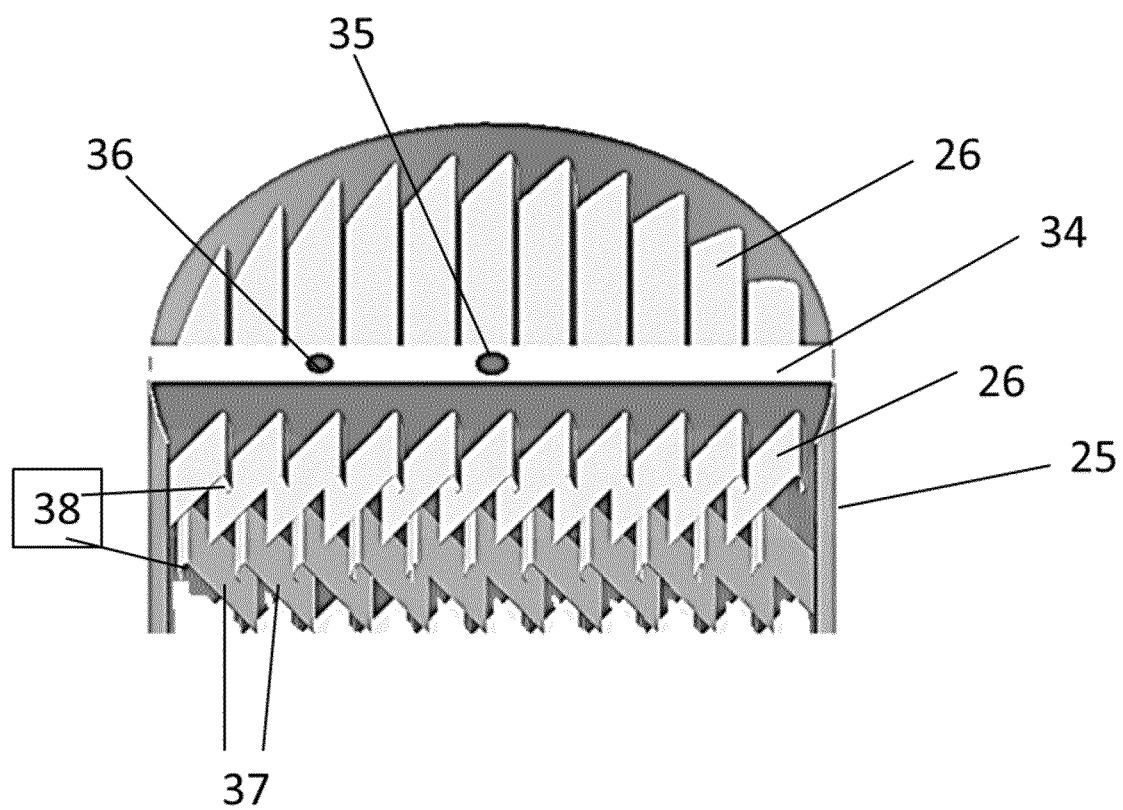
FIG. 3 is a perspective cut view of the first set of three phase separating means of the tower of FIG. 2.

The gas hoods 26 and 30 are hooded lamellas. The structure of the first set of settlers 25 is detailed in FIG. 3. The tower 21 is here a cylindrical tower. The set of settlers is arranged in a portion of the cylinder. The gas hoods 26 are here arranged parallel) on both sides of a central compartment or collecting box 34 dividing the cylinder portion along its diameter. The gas hoods are perpendicular to the compartment 34 and horizontally placed towards the compartment to favor flow of the gas towards the central compartment.

Each gas hood is a kind of long up-side-down gutter arranged horizontally and having one of its ends connected to the gas collecting box 34. The gas collecting box 34 is arranged with a hole 35 at the middle of its top face to let the downer 33 through and another hole 36 also on its top face to connect the riser 32. Each gas hood 26 consists of an oblique pane 37, which is curved or hooked downwardly at the top 38. The panes 37 of adjacent gas hoods 26 are parallel, the top 38 of one pane vertically overlapping the bottom of the adjacent gas hood, if any, thereby forming a hood. Two layers of gas hoods are here represented with the panes 37 of each layer tilted in opposite direction. The opposite directional gas hoods are preferred for optimal efficiency, but hoods could also be placed with the same orientation.

The parallel panes 37, show similarities with the well-known lamellas (settlers) generally used to promote sedimentation, owing to their large surface. These panes 37 can therefore play here the same function, though they may be of smaller size and/or surface than usual lamellas. The height can indeed be limited, in order to reduce the global height of the first set of settlers 25. The hooked top 38 forming a hood to collect biogas, the term hooded lamellas can be used to describe these particular gas hoods.

Now that the various elements of the tower have been described, the waste water treatment in itself will be explained.

The reactor 22 is full of water at all times. It does not contain any oxygen, the treatment being strictly anaerobic. A balance of incoming and outgoing water is ensured to avoid overpressure in the reactor.

The waste water enters the reactor 22 towards its bottom 34 with a determined flow, adjusted to promote turbulence in the active zone 24, where sludge is present. Sludge refers to particles of microorganisms able to digest the soluble organic pollutants of the water into mainly methane and water. Typically the tower reactor is filled with well settling granular anaerobic sludge from other reactors to shorten the start-up and adaptation phase.

The digestion of the pollutant generates methane as gas bubbles, which move upwards towards the first layer of hooded lamellas 26 of the first set of settlers 25, along with some sludge. The gas bubbles move up between the lamellas and are trapped under the hoods 38. As the bubbles move up, they possibly come in contact with the lamellas 37 which favor separation of the bubble and the sludge which remain on the panes 37 and then move downwards back into the active zone, due to gravity.

The gas entrapped under the hoods 38 flows into the gas collecting compartment 34, creating a gas lift effect that takes along sludge from under the collecting compartment with a sufficient flow into the riser 32 to promote the rise of the mixed liquor (sludge and water) and gas up to the gas collector tank 27, which is equipped with a gas outlet, generally placed on the top (not represented). The mixed liquor having risen along with the gas is decanted and re-circulated into the active zone 24 through the downer 33, under the force of gravity in the tank 27 and creating an important extra mixing effect which will be further discussed below The second layer of hooded lamellas (if applied) allows the remaining gas, not extracted through the first layer, to be similarly entrapped and the remaining sludge to be further separated and re-circulated downwards. Two layers of hooded lamellas are here illustrated. There could however be only one layer or a larger number of layers, depending on the size and/or design of the tower.

It is considered that one layer of hooded lamellas as in the invention is more efficient than a layer of the prior art. It is therefore possible to have a reduced number of layers of gas hoods and therefore increase the volume of the active zone 24 and/or decrease the total volume of the reactor tank 22.

Having the layers of hooded lamellas oriented in opposite directions forces the gas bubbles into a zigzag path thereby maximizing the collection of gas under the hoods.

Another advantage of the hooded lamellas of the invention is to avoid the upward suction effect present in conventional gas hoods. Indeed, in conventional gas hoods, the area through which the water may flow upwards is limited to the interstice between the vertical panes of two gas hoods. This creates a large acceleration of the flow in these interstices which results in dragging upwards a lot of solid materials.

Due to the combined effect of a smaller gas collecting area (small cross sectional area 34), and the structure of the hooded lamellas (which also occupy a limited surface area) a lower flow acceleration is induced which again improves the separation efficiency. The combination of the efficient separating capacity of the lamella part 37 and of the smaller cross sectional area of the hoods 38 results in a lower amount of gas and sludge being transferred to the polishing zone The turbulence in the polishing zone is much lower than in the active zone, due to the fact that less gas is generated because:
  a small amount of sludge can pass through the first set of settlers 25,
  most of the pollutants have already been degraded in the active zone, which results in
  a lower production of biogas thereby limiting the upward flow.

The liquid flow in the polishing zone is also lower as part of the liquid circulates through the riser and downer, thereby short-circuiting the polishing zone.

As a consequence, a lower amount of biogas and sludge reach the second set of settlers 29. The need for three phase separation is therefore limited and an efficient separation can be achieved by a lower amount of layers of hooded lamellas. Typically, there are fewer layers of gas hoods in the second set of three-phase separating means than in the first set of three phase separating means.

Because the second set 29 of three-phase separating means need to handle lower flows and lower particulate matter than the first set 25, the layer of hooded lamellas 30 of the second set 29 may be of a different design than the hooded lamellas 26 of the first set 25. In particular, to ensure that there is no turbulence above the last layer of gas hoods, the upper layer of hooded lamellas is sealed to the side wall of reactor 22, while clean water (virtually without sludge and biogas) reaches the outlet 31 with a laminar flow. By sealed, it is meant that the layer of hooded lamellas is arranged such that no biogas gas can reach the top of the reactor 22 without passing between two lamellas and under a hood.

To further enhance the solid-liquid separation, the connection between the gas hoods and the gas collecting box 34 can be arranged with means to retain a layer of gas in the hood.

In usual settlers, the extremity of the gas hood is connected to the gas collecting box through a simple hole crossing the vertical section of the gas collecting box. This allows all the biogas produced to be extracted to the risers via the gas collecting box. It is common knowledge that maintaining a "buffer" layer of gas under the hood enables a much better separation of the sludge and water in this zone.

Figure 4:
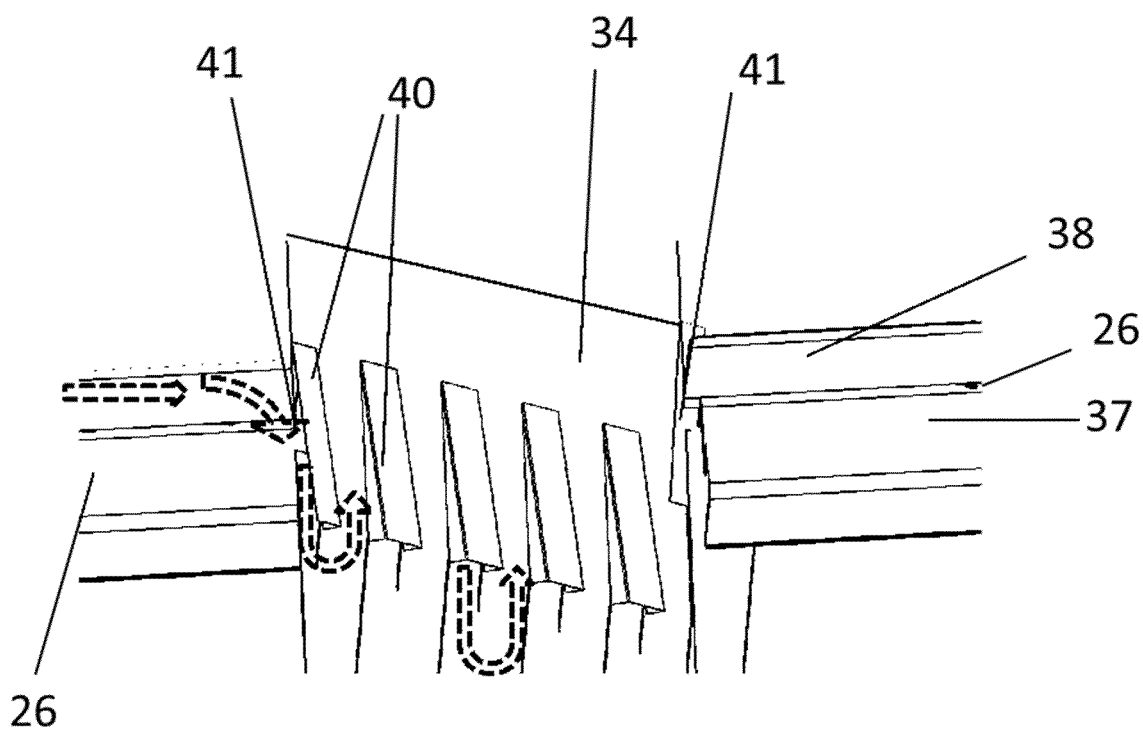
FIG. 4 is a perspective cut view of the connection means between the gas hoods and the gas collecting box of the invention.

To this end, referring to FIG. 4, a cover plate 40 can be placed facing the hole 41, inside the gas collecting box 34, in order to force the gas flow, illustrated by the dotted arrows, to go down to the lower part of the cover level before being able to move up again in the gas collector box 34.

This way, the highest layer of gas under the hood 38 cannot be displaced towards the collector box 34, as it is retained by the cover plate 40.

One gas collecting box 34 is usually used by a set of three phase separators or settlers. However, depending on the size of the installation, a larger number of gas collecting boxes could be used, or a gas collecting box could be split in several compartments. For example, each layer of hooded lamella can be connected to a different compartment. Each box or each compartment can be equipped with its own riser.

The risers are directly connected to the gas collector tank. In large installations, there may be several independent gas collector tanks.

The riser pipes are designed in a way to optimize the ratio between biogas and water as well as the bubble size in the riser(s).

A riser can have its lower end slightly inside the gas collecting box in order to allow the right flow pattern of water and biogas in the riser.

The layers of gas hoods can be manufactured so as to be modular, i.e. easy to superimpose or remove from the set of settlers.

The set of separating means of the invention thus enable a better separation and recirculation of the sludge into the active zone. To ensure that the sludge does not settle at the bottom of the reactor, the hooded lamellas of the invention are advantageously combined with an accordion shaped bottom of the reactor.

Figure 5:
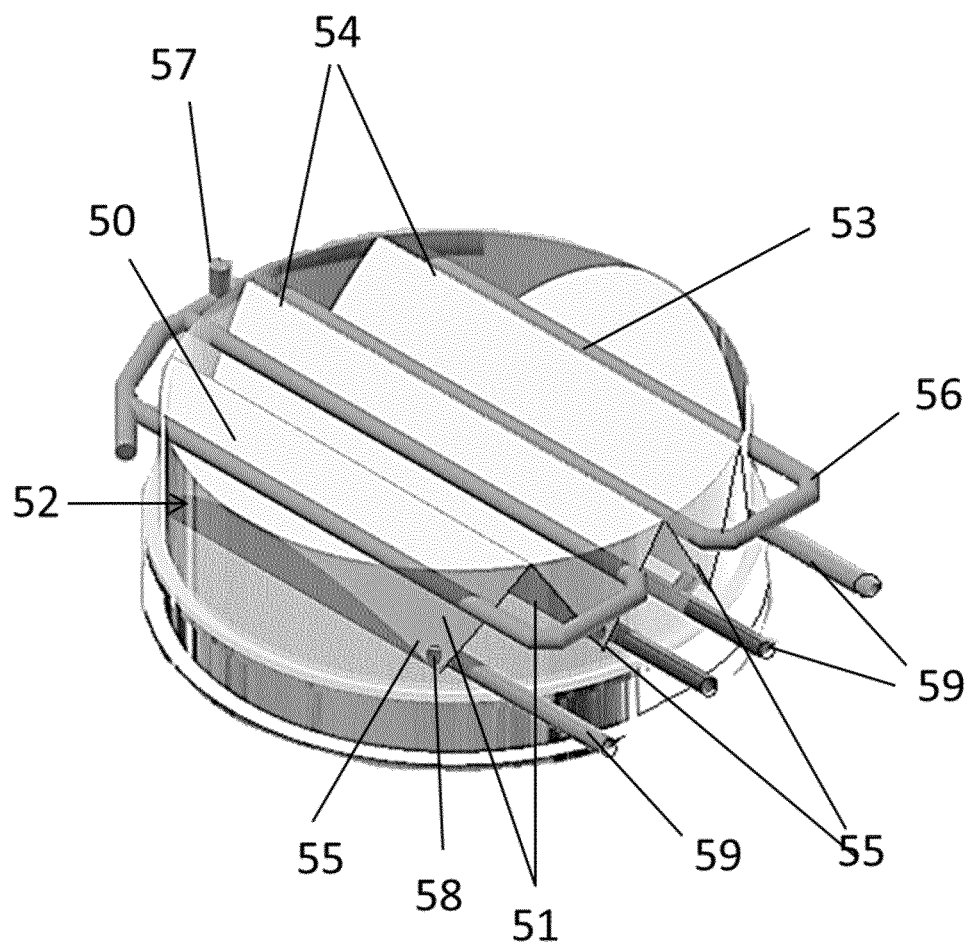
FIG. 5 is a perspective view of a preferred configuration of the bottom of a reactor according to the invention.

Referring to FIG. 5, the bottom surface 50 of a sludge reactor 52 is arranged with a accordion shaped floor or ground, i.e. with folds forming alternating crests 54 and vales 55 and 56. The waste water inlets tubes 53 extend horizontally above the vales 55 and 56 at the reactor bottom. The tubes 53 here pass through the reactor wall 52 in such a way that a return loop 56 is located outside the reactor 52, as well as the splits of one common waste water arrival 57 into the several tubes 53.

The waste water inlet pipes, though here disclosed extending along and above the vales, can be placed according to any other suitable pattern, for example in a perpendicular and/or parallel disposition regarding the bottom crests 54, they can be above or even embedded within the crests. If the pipes are placed parallel to the vales, the pipes may cross completely the reactor tank 52 and the feeding loop is outside of the reactor tank.

Figure 7:
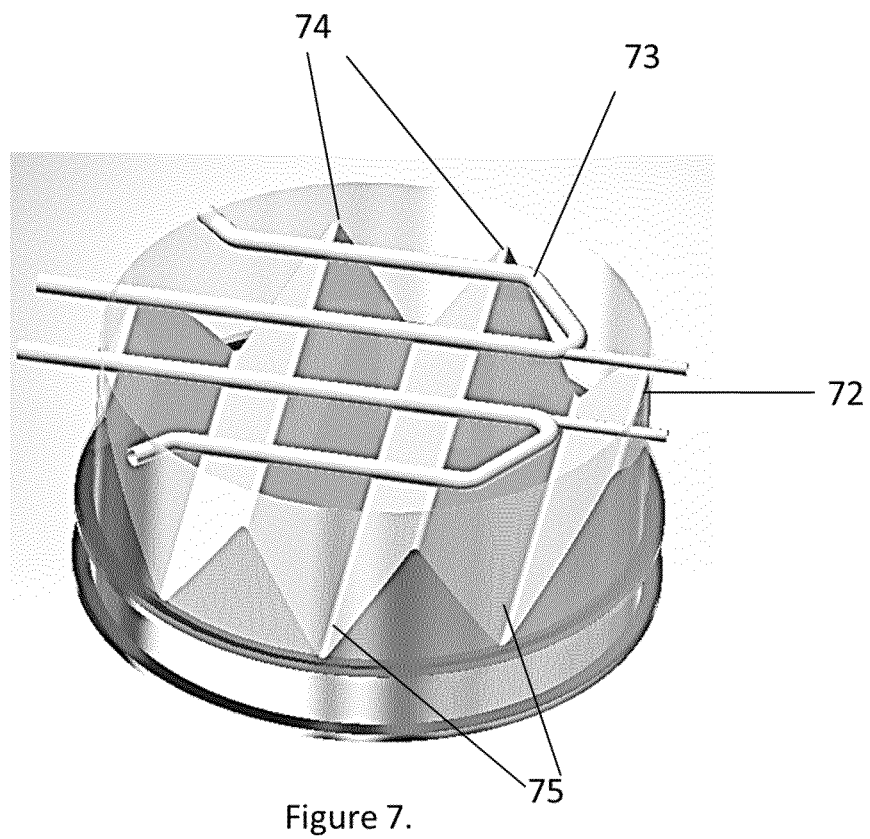
FIG. 7 is a perspective view of another configuration of the bottom of a reactor according to the invention.

If the wastewater feeding lines are placed perpendicularly to the vales and crests, as disclosed for the reactor 72 illustrated on FIG. 7, the feeding pipes 73 can be located slightly above the vales 75 and crests 74.

Preferably, there is no fluid below the accordion floor (apart from fluid that may be flowing in pipelines running below this floor). The section below the floor may conveniently accommodate pipelines, circuitry or any other element of interest.

The inlet tubes 53 present orifices spread over the length of the tubes and oriented in several radial directions to create a complete mixing of waste water and sludge.

Whenever sludge fall or accumulates towards the bottom of the reactor 52, it can be re-suspended or fluidized owing to the flow and turbulence created in this zone by the incoming waste water and further enforced by the down comer flow.

The orientation of the orifices in the water inlet tubes 53 is adjusted to the specific reactor. For example, orifices can be positioned to create a downward flow to re-suspend sludge accumulating at the bottom of the vales 55 and 56.

Preferably, orifices are positioned on the lateral sides of the tubes to create a generally horizontal flow, which can be slightly oriented upwards and/or downwards to create a swirling motion of water and/or sludge, for a better mix and fluidization of the sludge in the above active zone.

Such arrangement of waste water inlet tubes is not possible with the conical shaped reactor bottom of the prior art.

FIG. 5 illustrates a reactor bottom with three crests and four vales. These numbers can vary depending on the size of the installation. Preferably, the inlet tubes extend along more or less the full lengths of the vales. The inlets tubes can be positioned slightly above the level of the crests, or at the same level or slightly below.

Advantageously, the vales are equipped with means to remove settled heavy unreactive solid materials, like heavy sludge, or other inorganic materials. Several extraction/removal points 59 can be arranged along a vale and connected to sludge outlets 58, advantageously placed inside or under the accordion structure. These removal means can be manual or automated, and can depend on quality measurements made on sludge samples.

To further optimize the mixing in the active area, the downer(s) can be arranged to recirculate water from the gas collector tank with a specific flow orientation.

Figure 6:
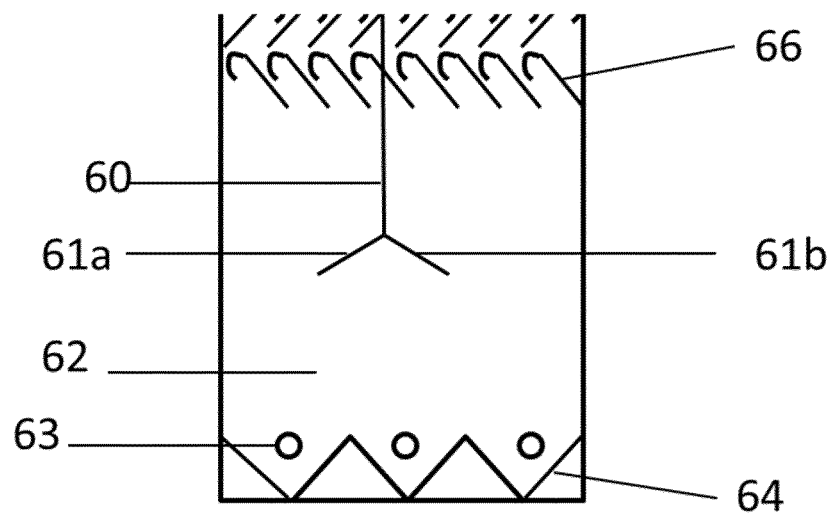
FIG. 6 illustrates a particular embodiment of internal recirculation according to the invention.

Referring to FIG. 6, the downer 60 connects the gas collecting tank to the active zone 62, where the main anaerobic sludge degradation of pollutants occurs. At its lowest extremity, the downer 60 is divided in two tubes 61a and 61b. The tubes 61a and 61b can be configured to impart a determined direction to the flow of down-coming water from the gas collector tank. In particular, a swirling flow can be imparted to the water which is recycled from the gas collector tank. This flow can be adjusted in combination with the flow imparted by the inlet tubes 63 at the bottom 64 of the reactor, in order to optimize the mixing in the active zone 62. The height of the extremity of the downers 61a and 61b can also be foreseen to optimally combine the flows in the active zone 62.

This internal recirculation from the gas collector tank is a smart way to remove biogas and to improve the mixing in the lowest section of the active zone. This means that a bigger biogas production will mean a bigger internal flow of water and gas through the riser pipes, resulting in a bigger flow through the downer pipe, improving the mixing and the biogas production as well. As mixing in the active zone is the key factor to efficiency of the anaerobic treatment installation, internal recirculation is a simple and cost effective solution.

The gas collector and separation tank is a key element for internal recirculation where an equilibrium of pressures need to be maintained between the incoming gas/water mixture from the riser(s), the outlet of gas and the recirculation of water through the downer. Depending on the size of the treatment tower, several gas tanks may be installed, instead of one, as represented in FIG. 2. The gas tank collector may be placed inside or outside of the reactor tank/tower.

The effluent clean water is collected in overflow weirs (cf FIG. 2, 31).

Additionally, to adjust the incoming flows in the reactor, in particular in the active zone, some of the cleaned water can also be recirculated if needed. Recirculation means of cleaned water can be installed inside the reactor or can be external.

Overall, with a high COD load, the biogas production increases, resulting in an increase of internal recirculation, optimizing the turbulence in the sludge bed, obtaining a slight diluting effect of the inlet flow and thereby an increase of the capacity of the mass transfer phenomena.

A cylindrical tower has been represented here. However, it is possible to have other shapes, like for example a square or rectangular section, or a deformed circular section.

Laboratory research has confirmed that there are three main factors for an optimally functioning reactor:
- an efficient mixing between the bio-sludge and the wastewater,
- a good three-phase separation process allowing to keep the bio-sludge inside of the tower, and
- an accordion shaped waste water inlet zone.

Figure 8:
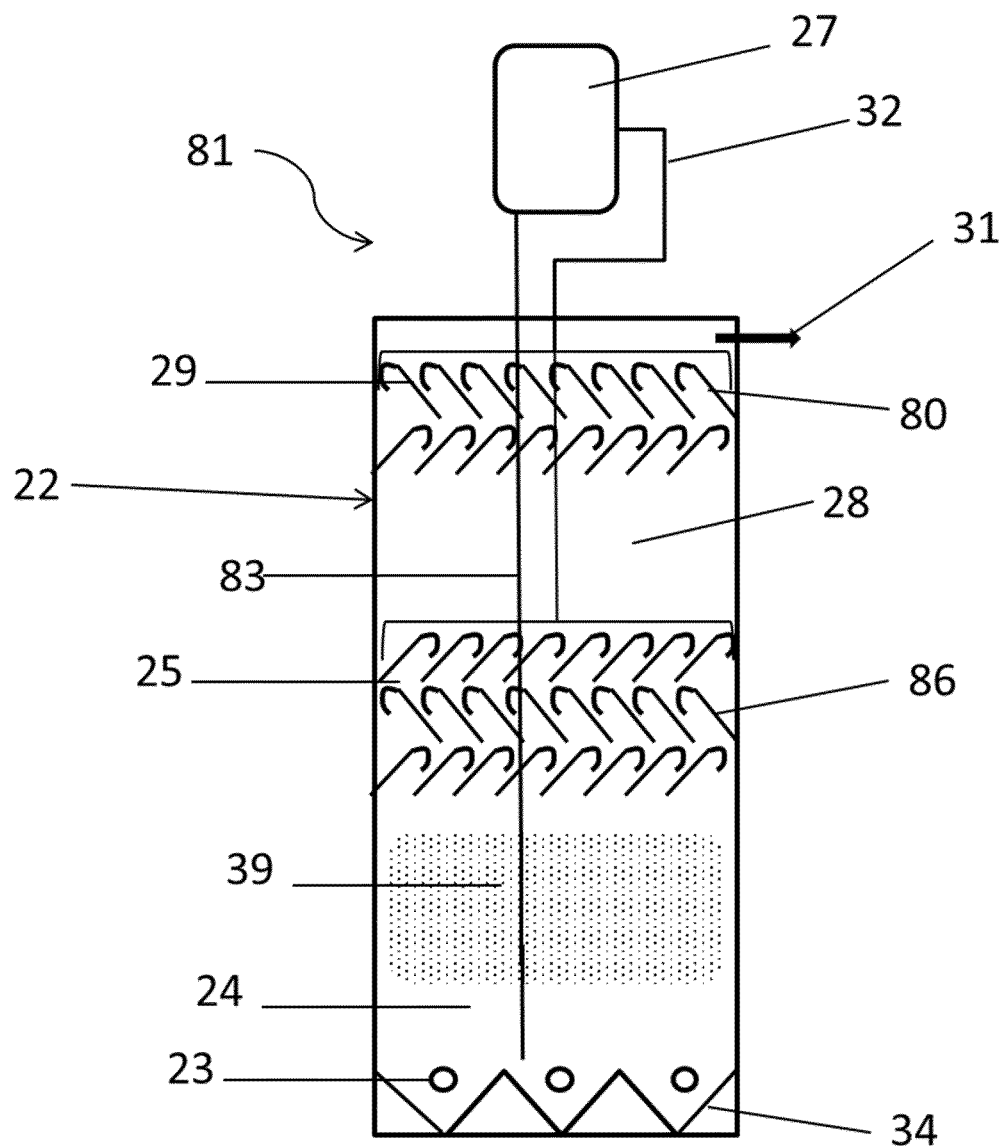
FIG. 8 is a schematic lateral view of a waste water purification tower according to the invention, as used for modelling experiments.

In particular, modelling by Computational Fluid dynamics (CFD) of the gas and granule flow in a reactor, as depicted in FIG. 8, was performed. The same numbering in FIGS. 2 and 8 is applied for common features. In this reactor tower 81, a first set of three phase separating means, comprising three layers of hooded lamellas 86 are positioned at about ⅔ of the height of the tower 81, and a second set of three phase separating means comprising two layers of hooded lamellas 80, are positioned close to the top of the tower.

The inlet zone is similar to the inlet zone depicted in FIG. 5, and the downer 83 goes down close to the inlet zone.

For modelling, the sludge granule density is set to 1030 to 1100 kg/m$^3$, with a granule size of 1-2 mm. The total influent flow rate is set to 72.4 m$^3$/h and the maximum upflow velocity to 16 m/h.

Figure 9:
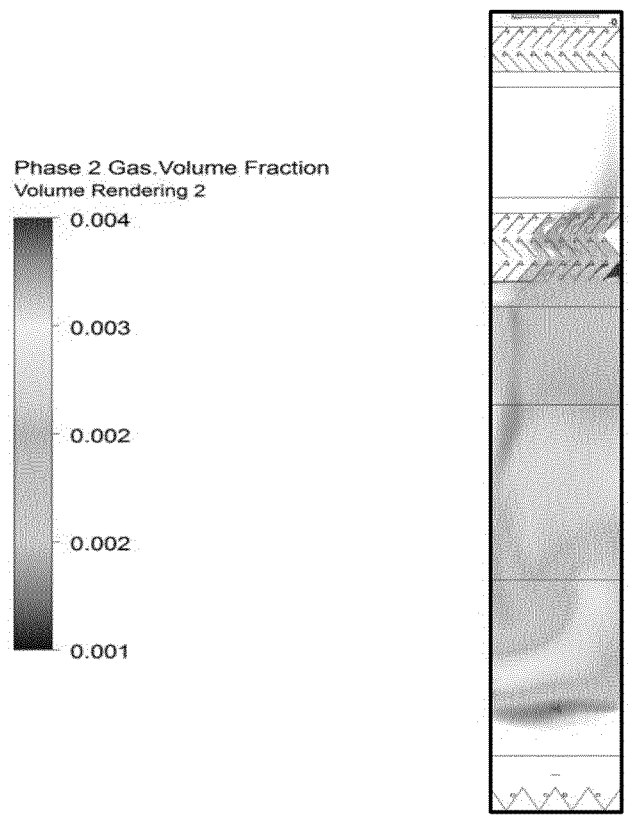
FIG. 9 is a chart showing the modelled gas distribution during operation of the reactor of FIG. 8.

The reactor is designed for a nominal treatment of 250 m$^3$/day and a gas production of 563 Nm$^3$/day According to expectations, and as shown in FIG. 9, very little of the gas produced in the active zone 24 is leaking to the polishing zone 28. Over 80% of the gas is captured by the three layers of the hooded lamellas of the first set of three phase separators. Further modelling has shown that if four layers were used, 100% of the gas would be captured by the first set of three phase separators. The alternating orientation of superimposed hooded lamellas contributes to the efficiency.

Figure 10:
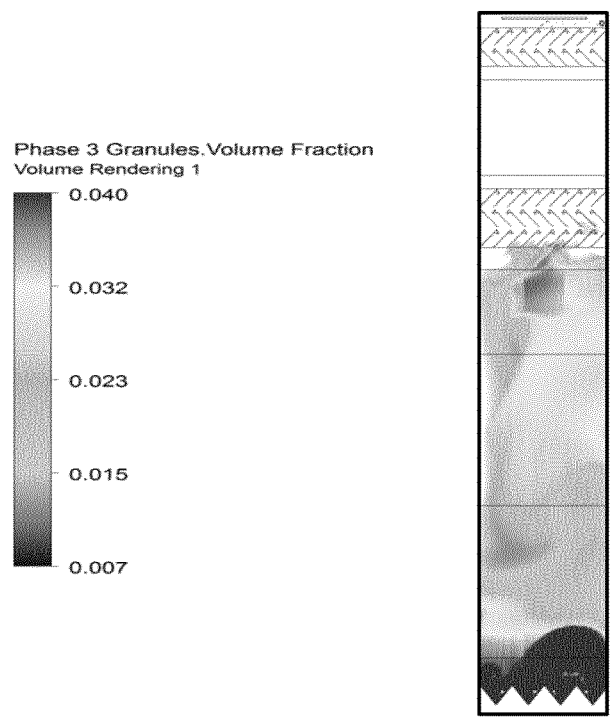
FIG. 10 is a chart showing the modelled sludge granules distribution during operation of the reactor of FIG. 8.

Moreover, and as shown on FIG. 10, no sludge granules are expected to be present in the polishing zone. This support the fact that a polishing zone and a second set of three phase separators is not compulsory to build an efficient reactor tower. The granules are well mixed in the active zone, due to the accordion shaped bottom and the downer effect.

The invention claimed is:

1. Anaerobic waste water purification tower comprising a sludge reactor with, from bottom to top:
    a waste water inlet zone,
    an active zone,
    a first set of three phase separating means for separating sludge, gas and water, comprising at least two layers of adjacent gas hoods connected to a gas collector tank positioned above the reactor, and
    a clean water effluent outlet,
characterized in that the gas hoods are hooded lamellas for improving the separation of gas, sludge and water characterized in that the layers of hooded lamellas are oriented in opposite directions.

2. The waste water purification tower according to claim 1, wherein the gas hoods and the gas collector tank are connected by a riser, a downer being provided for recycling water from the gas collector tank to the active zone.

3. The waste water purification tower according to claim 1, wherein means are provided between each gas hood and the gas collector tank for maintaining a gas buffer in said each gas hood.

4. The waste water purification tower according to claim 1, further comprising above the first set of three phase separating means:
    a polishing zone,
    a second set of three phase separating means comprising at least one layer of gas hoods connected at one end to the gas collector tank positioned above the reactor.

5. The waste water purification tower according to claim 4, wherein there are fewer layers of gas hoods in the second set than in the first set of three phase separating means.

6. The waste water purification tower according to claim 4, wherein the second set of three phase separating means has an upper layer of hooded lamellas which is sealed to a side wall of the reactor.

7. The waste water purification tower according to claim 1, wherein a bottom of the reactor is accordion shaped.

8. The waste water purification tower according to claim 7, wherein the bottom of the reactor is arranged with folds forming alternating crests and vales, and perforated waste water inlets means extending above and along the vales to enhance resuspension of granular sludge.

9. The waste water purification tower according to claim 8, wherein the vales are equipped with means to remove settled solid materials from the reactor.

10. The waste water purification tower according to claim 2, wherein a lowest extremity of the downer is arranged to impart a determined direction to a flow of down-coming water from the gas collector tank to enhance a resuspension of granular sludge.

* * * * *